(12) United States Patent  (10) Patent No.: US 8,642,874 B2
Ribner                     (45) Date of Patent:     Feb. 4, 2014

(54) DRUM AND DRUM-SET TUNER

(75) Inventor: David Byrd Ribner, Andover, MA (US)

(73) Assignee: Overtone Labs, Inc., Lawrence, MA (US)

( * ) Notice: Subject to any disclaimer, the term of this patent is extended or adjusted under 35 U.S.C. 154(b) by 353 days.

(21) Appl. No.: 13/004,166

(22) Filed: Jan. 11, 2011

(65) Prior Publication Data
US 2011/0179939 A1   Jul. 28, 2011

Related U.S. Application Data

(60) Provisional application No. 61/297,578, filed on Jan. 22, 2010.

(51) Int. Cl.
G10H 1/44 (2006.01)
G10H 1/06 (2006.01)

(52) U.S. Cl.
USPC .............. 84/616; 84/654; 84/454; 84/458

(58) Field of Classification Search
USPC .................. 84/616, 654, 454, 458
See application file for complete search history.

(56) References Cited

U.S. PATENT DOCUMENTS

| 4,023,462 | A | * | 5/1977 | Denov et al. | 84/454 |
| 4,453,448 | A | | 6/1984 | Miesak | |
| 4,539,518 | A | * | 9/1985 | Kitayoshi | 324/76.21 |
| 4,741,242 | A | | 5/1988 | Aronstein | |
| 5,423,241 | A | * | 6/1995 | Scarton et al. | 84/454 |
| 5,598,505 | A | * | 1/1997 | Austin et al. | 704/226 |
| 5,770,810 | A | | 6/1998 | Lombardi | |
| 5,920,026 | A | * | 7/1999 | Yoshino et al. | 84/738 |
| 6,066,790 | A | | 5/2000 | Freeland et al. | |
| 6,121,538 | A | * | 9/2000 | Yoshino et al. | 84/738 |

(Continued)

FOREIGN PATENT DOCUMENTS

| JP | 2002516418 | | 6/2002 |
| JP | 2005301318 | A | 10/2005 |

(Continued)

OTHER PUBLICATIONS

International Search Report and Written Opinion in related international patent application No. PCT/US2011/020751, mailed Sep. 28, 2011, 12 pages.

(Continued)

*Primary Examiner* — David S. Warren
(74) *Attorney, Agent, or Firm* — Schmeiser, Olsen & Watts, LLP

(57) ABSTRACT

A resonance tuner receives and digitizes an analog signal in response to a resonance of a structure thereby creating a plurality of time samples. A series of the time samples are buffered upon burst detection. A power spectrum is estimated by computing a Time-To-Frequency-Transform of the series of time samples and a magnitude of each of the resulting frequency samples is squared. At least one subset associated with at least one spectral peak is selected from the frequency samples. Each spectral peak has at least one sample with a sufficient magnitude and being spectrally adjacent to any other sample in another spectral peak by less than a threshold. A fundamental spectral peak is determined in a fundamental subset including a spectral peak with a sample at the lowest frequency greater than zero. The fundamental spectral peak has the sample with the largest magnitude within the fundamental subset.

24 Claims, 10 Drawing Sheets

(56) References Cited

U.S. PATENT DOCUMENTS

| | | | |
|---|---|---|---|
| 6,271,458 B1* | 8/2001 | Yoshino et al. | 84/738 |
| 6,725,108 B1* | 4/2004 | Hall | 700/94 |
| 6,756,535 B1* | 6/2004 | Yoshino et al. | 84/738 |
| 6,812,392 B2 | 11/2004 | Brando | |
| 6,925,880 B1 | 8/2005 | Roberts | |
| 6,996,523 B1* | 2/2006 | Bhaskar et al. | 704/222 |
| 7,271,329 B2* | 9/2007 | Franzblau | 84/609 |
| 7,272,556 B1* | 9/2007 | Aguilar et al. | 704/230 |
| 7,288,709 B2 | 10/2007 | Chiba | |
| 7,323,629 B2* | 1/2008 | Somani et al. | 84/470 R |
| 7,376,553 B2* | 5/2008 | Quinn | 704/200.1 |
| 7,385,135 B2* | 6/2008 | Yoshino et al. | 84/738 |
| 7,493,254 B2 | 2/2009 | Jung et al. | |
| 7,547,840 B2* | 6/2009 | Noh et al. | 84/601 |
| 7,598,447 B2* | 10/2009 | Walker et al. | 84/616 |
| 7,672,843 B2* | 3/2010 | Srinivasan et al. | 704/231 |
| 7,888,568 B2 | 2/2011 | Kashioka | |
| 7,982,114 B2* | 7/2011 | Applewhite et al. | 84/477 R |
| 8,008,566 B2* | 8/2011 | Walker et al. | 84/609 |
| 8,076,564 B2* | 12/2011 | Applewhite | 84/477 R |
| 8,244,527 B2* | 8/2012 | Srinivasan et al. | 704/231 |
| 8,283,544 B2* | 10/2012 | Zuffante et al. | 84/454 |
| 8,309,834 B2* | 11/2012 | Gehring et al. | 84/613 |
| 2004/0089136 A1 | 5/2004 | Georges et al. | |
| 2005/0223880 A1 | 10/2005 | Yoshino et al. | |
| 2005/0232411 A1* | 10/2005 | Srinivasan et al. | 379/413 |
| 2008/0052068 A1* | 2/2008 | Aguilar et al. | 704/230 |
| 2008/0229907 A1 | 9/2008 | Clark | |
| 2009/0271182 A1* | 10/2009 | Athineos et al. | 704/205 |
| 2009/0288547 A1 | 11/2009 | Lazovic | |
| 2010/0083812 A1 | 4/2010 | Peavey | |
| 2010/0195837 A1* | 8/2010 | Srinivasan et al. | 381/56 |
| 2010/0212475 A1* | 8/2010 | Toulson | 84/454 |
| 2011/0179939 A1* | 7/2011 | Ribner | 84/454 |
| 2011/0252943 A1 | 10/2011 | Zuffante et al. | |
| 2012/0240749 A1* | 9/2012 | Bjornson | 84/454 |

FOREIGN PATENT DOCUMENTS

| | | |
|---|---|---|
| JP | 2006227452 A | 8/2006 |
| JP | 2006010869 A | 12/2006 |
| JP | 2008070581 A | 3/2008 |
| JP | 2008090058 A | 4/2008 |
| JP | 2008090202 A | 4/2008 |
| JP | 2008129539 A | 5/2008 |
| JP | 2009528550 A | 8/2009 |
| JP | 2010061107 A | 3/2010 |
| WO | 2009010713 A1 | 1/2009 |

OTHER PUBLICATIONS

Toulson, Rob et al., "Percussion Acoustics and Quantitative Drum Tuning", Audio Engineering Society Tutorial T3, New York, Oct. 2009; 31 pages.

Richardson, Phillip et al., "Fine Tuning Percussion—A New Educational Approach", 2010; 18 pages.

Toulson, Rob et al., "The Perception and Importance of Drum Tuning in Live Performance and Music Production", Journal on the Art of Record Production, ISSN 1754-9892, Issue 4, Oct. 2009; 7 pages.

PGM Richardson et al., "Clearing the Drumhead by Acoustic Analysis Method", 2010; 8 pages.

Worland, Randy, "Normal Modes of a Musical Drumhead Under Non-Uniform Tension", Journal of the Acoustical Society of America, Jan. 2010; 10 pages.

Sunohara, Masahiro et al., "The Acoustics of Japanese Wooden Drums called "Mokugyo"", Journal of the Acoustical Society of America, Apr. 2005; 13 pages.

Toulson, Rob, "Percussion Acoustics and Quantitative Drum Tuning", Audio Engineering Society Tutorial T3, New York, Oct. 2009; 30 pages.

International Search Report and Written Opinion in related international application No. PCT/US2012/066999, mailed on Mar. 13, 2013; 12 pages.

Notice of Allowance in related U.S. Appl. No. 13/786,799, mailed on May 28, 2013; 9 pages.

* cited by examiner

Drum

Drum Transient Response

Drum Power Spectrum

Drum Tuner

Pitch Estimator

Power-Spectral Estimator

Burst Detector

Drum-Set Tuner

Automatic Drum Tuning

DRUM AND DRUM-SET TUNER

CROSS-REFERENCE TO RELATED APPLICATIONS

This application is a utility application claiming priority to U.S. Provisional Application Ser. No. 61/297,578 filed on Jan. 22, 2010 entitled "DRUM AND DRUM-SET TUNER," the entirety of which is incorporated by reference herein.

FIELD OF THE INVENTION

The invention relates generally to spectral analysis. More specifically, the invention relates to detection of a fundamental frequency to facilitate tuning of a resonant structure.

BACKGROUND

A variety of structures resonate with a fundamental frequency often combined with a plurality of other frequencies that make detection and analysis of the fundamental frequency problematic. Furthermore, many structures resonant for only a short period of time. A particular example of a resonant structure is a drum.

In one example, a drum consists of a hollow cylinder with a circular membrane clamped to either or both ends of the cylinder. A circular membrane that is suspended under tension at its outer perimeter is capable of several modes of vibration including circular symmetric and angular modes. The circular modes are described by a series of first-order Bessel functions for example and are therefore not harmonically related. The frequency of vibration depends, in part, on the radius, tension and density of the membrane. A cylindrical air column also resonates with the frequency of resonance depending on the length of the drum and the speed of sound and whether or not the ends of the cylinder are open or closed. Furthermore, the combination of a cylindrical shell and cylindrical membranes resonates as a system at a variety of frequencies that depend on a number of parameters, such as the dimensions of the drum, the tension and density of the drum-heads and the composition of the shell.

In one example, a drum-head is held by a metal or wooden hoop that is attached to a drum shell with several adjustable tension screws. The tension of the drum-head is determined by the force exerted by the tension screws. Tuning involves adjusting the tension screws to achieve a uniform pitch over a drum-head. When the pitch is uniform around the perimeter of the drum, the drum-head is considered to be "cleared" or "in tune with itself." In addition to being in tune with itself, each drum-head needs to be adjusted to a pitch that produces the desired overall sound. It is sometimes desirable to tune each head separately with the other held damped to prevent vibration.

Striking a drum produces a percussive sound that's shorter in duration than any non-percussive musical instrument. The time-domain response of a typical drum, consists of an oscillatory signal with an abrupt onset followed by a short, approximately exponential, decay. Air pressure acting on the large area of the drum-head limits the duration of the sound. A vibrating string on the other hand has a much smaller area than a drum-head and vibrates much longer in comparison.

Tuning a set of drums poses additional challenges for musician. Some drummers tune their drums to a musical chord such as a major chord. Other drummers tune their drums to relative tonic intervals such as thirds or fifths, and still others tune by ear to something suiting their musical taste. The choice of specific drum pitches sometimes depends on the type of music being played. A drum-set might be tuned higher for jazz than for rock, for example, or it might be tuned open to resonate for a live performance or tight for a recording. Tuning also depends on the size and type of drum. A larger diameter drum is usually tuned lower than a smaller diameter drum. Often drummers attempt to copy the pitches used by other drummers from recordings or from memory. In general, the desired tuning of a drum-set depends on the particular sound the drummer is looking for.

A drum produces a unique sound when its head is struck resulting from the resonance of the vibrating heads in conjunction with the shell of the drum. Striking a drum excites several rapidly-decaying, non-harmonic modes of vibration resulting in a short, complex burst of sound. Drum tuning, by adjustment of a drum-head tension, to control pitch, tone and timber is essential in establishing a pleasing drum sound. Tuning any musical instrument involves playing a note, measuring or comparing the pitch of the note to some reference and adjusting the instrument's pitch until it conforms to the reference. However, assessing the pitch of a drum is complicated by the short duration and multiple non-harmonic resonances comprising its sound. Melodic instruments, on the other hand, produce continuous, periodic (harmonic) sounds with easy to measure pitch and are therefore much simpler to tune than a drum.

Drum tuning is typically done by ear, which is an art subject to the skill and taste of an individual musician. In addition, tuning by ear is inaccurate and has poor repeatability of results. Moreover, it is increasingly difficult to tune by ear when tuning a drum-set where each drum typically is tuned to a different pitch or to tune the drum-set to a variety of popular drum-set sounds varying based on style of music or the acoustic properties of the physical environment within which the drum-set will be used.

Existing tuners for melodic instruments such as guitars and pianos are unsuitable for drum or drum-set tuning. They require a sustained tone duration that is longer than the duration of a drum sound and only operate correctly on a periodic signal consisting of a single fundamental and associated harmonics, not on the transient sound produced by a drum. Drums typically create overtones unlike harmonics that are more easily distinguished from the fundamental frequency. Overtones are typically related to the fundamental frequency by a product of $\pi$ (pi), being related to the area and circumference of the drum-head.

Mechanical tuning devices exist that measure the tension of the drum-head by measuring the deflection of the head for a given force but do not measure the pitch produced by a drum and thus suffer from a variety of inaccuracies due to drum skin thickness and temperature variations for example.

BRIEF SUMMARY

In one aspect, the invention features a method for resonance tuning comprising receiving an analog signal in response to a resonance of a structure. The analog signal is digitized to create a plurality of time samples. A burst of the time samples is detected, enabling a trigger thereby. A series of time samples is buffered from the plurality of time samples in response to the trigger being enabled. A power spectrum is estimated by computing a Time-To-Frequency-Transform of the series of time samples to create a series of frequency samples and squaring a magnitude of each of the frequency samples. One or more subsets of frequency samples from the series of frequency samples is selected. Each subset is associated with one or more spectral peaks and each spectral peak includes at least one of the frequency samples having a first magnitude exceeding a first threshold and being spectrally adjacent to any other of the frequency samples in any other spectral peak within the same subset by less than a second threshold. A fundamental spectral peak in a fundamental subset is determined. The fundamental subset includes the spectral peak having the frequency sample at the lowest frequency greater than zero. The fundamental spectral peak has the frequency sample with the largest first magnitude within the fundamental subset.

In another aspect, the invention features a resonance tuner comprising a receiver configured to generate an analog signal in response to a resonance of a structure. An analog to digital converter is in communication with the receiver and is configured to generate a plurality of time samples of the analog signal. A pitch estimator is in communication with the analog to digital converter and is configured to calculate a fundamental spectral peak of the resonance of the structure from the plurality of time samples. A display module is in communication with the pitch estimator and is configured to display information to a user based on a fundamental spectral peak of the structure.

In another aspect, the invention features a drum-set tuner comprising a receiver configured to generate an analog signal in response to a resonance of a membrane of a drum. The analog to digital converter is in communication with the receiver and is configured to generate a plurality of time samples of the analog signal. A pitch estimator is in communication with the analog to digital converter and is configured to calculate a fundamental spectral peak of the resonance of the membrane of the drum from the plurality of time samples. A user interface module is in communication with the pitch estimator. The user interface module includes a one or more input controls configured to accept user inputs and a display configured to display information to a user based on a fundamental spectral peak of the membrane of the drum. A pitch-set processor is in communication with the pitch estimator and the user interface module. The pitch-set processor specifies the pitches of the various drum-heads in a set of drums.

In another aspect, the invention features a method for automatic drum tuning comprising measuring a plurality of pitches. Each measurement is made after striking the drum-head proximal to a respective tuning lug in a plurality of tuning lugs of a drum-head. The lowest pitch lug associated with the lowest pitch of the plurality of pitches is determined. A location of the lowest pitch lug and a deviation of the pitch of the lowest pitch lug from a selected pitch is displayed on a user interface.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of resonance tuners described herein provide for the measurement of a fundamental frequency of a structure from a short duration transient signal that typically includes other frequencies. In one embodiment, the resonant structure is a vibrating blade in a turbine engine. The signal is measured by acoustic emissions from the blade. In another embodiment, the signal from the blade is measured with an interferometer. In another embodiment, the resonant structure is a vocal cord from a person practicing musical scales. A microphone measures the signal from the vocalist.

In a preferred embodiment, the resonant structure is a drum-head, with a signal measured by a receiver or sensor. The fundamental pitch of a drum is measured to facilitate drum tuning. A receiver produces an electrical signal corresponding to the sound or vibration produced by the drum, after the drum is struck.

Figure 1:
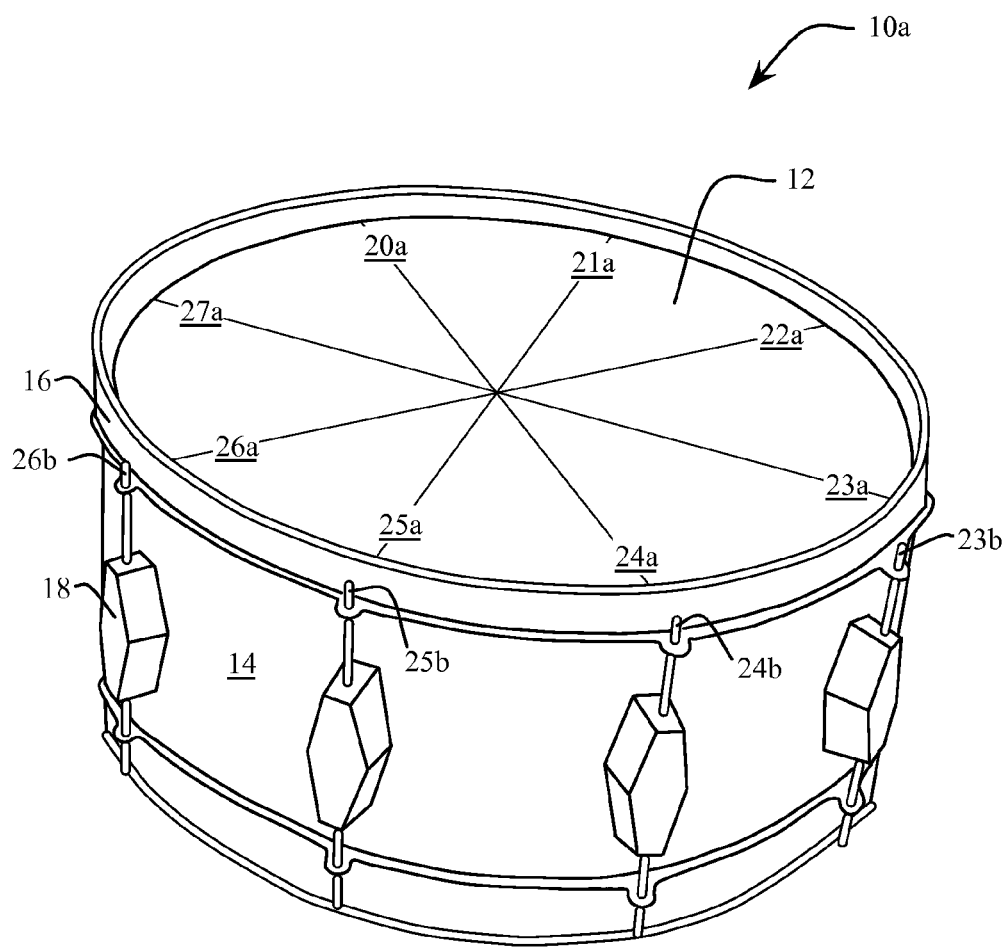
FIG. 1 is a perspective view of a drum usable with an embodiment of the invention.

FIG. 1 shows a perspective view of a typical "tom-tom" drum 10a, which in one example, is used with the invention. The drum 10a includes a circular membrane (drum-head) 12 suspended under tension on top of the drum shell 14 by a hoop 16. The tension of the membrane 12 is adjusted by tightening the hoop 16 with a plurality of lugs 20b, 21b, 22b 23b and 27b (not shown in FIG. 1) and lugs 23b, 24b, 25b and 26b. Each lug is affixed to the drum shell 14 by an attachment 18. The drum shown in FIG. 1 shows a single membrane 12, although in other embodiments a second membrane is present on the opposing side of the drum. In one embodiment, when an opposing membrane is present, the opposing membrane is "damped" or put on a towel or cushion to substantially prevent the opposing membrane from interacting with the membrane 12 during the tuning of membrane 12. Subsequent to tuning the membrane 12, the opposing membrane is tuned with membrane 12 damped. In another embodiment, the membrane 12 is tuned without damping the opposing membrane.

Adjusting the tension of the membrane 12 requires adjusting each of the lugs to "clear" the drum and adjusting all of the lugs to achieve a desired pitch. Each lug is adjusted by imparting energy to the membrane 12 in the vicinity of the lug. For example, to adjust lug 24b, a musician would tap the membrane 12 near location 24a. Similarly, to adjust lug 25b, the musician would tap the membrane 12 near location 25a. Tapping is typically performed by striking the membrane 12 with a drum stick, although approaches where an impulse of energy is delivered to the membrane 12 are envisioned.

Figure 2:
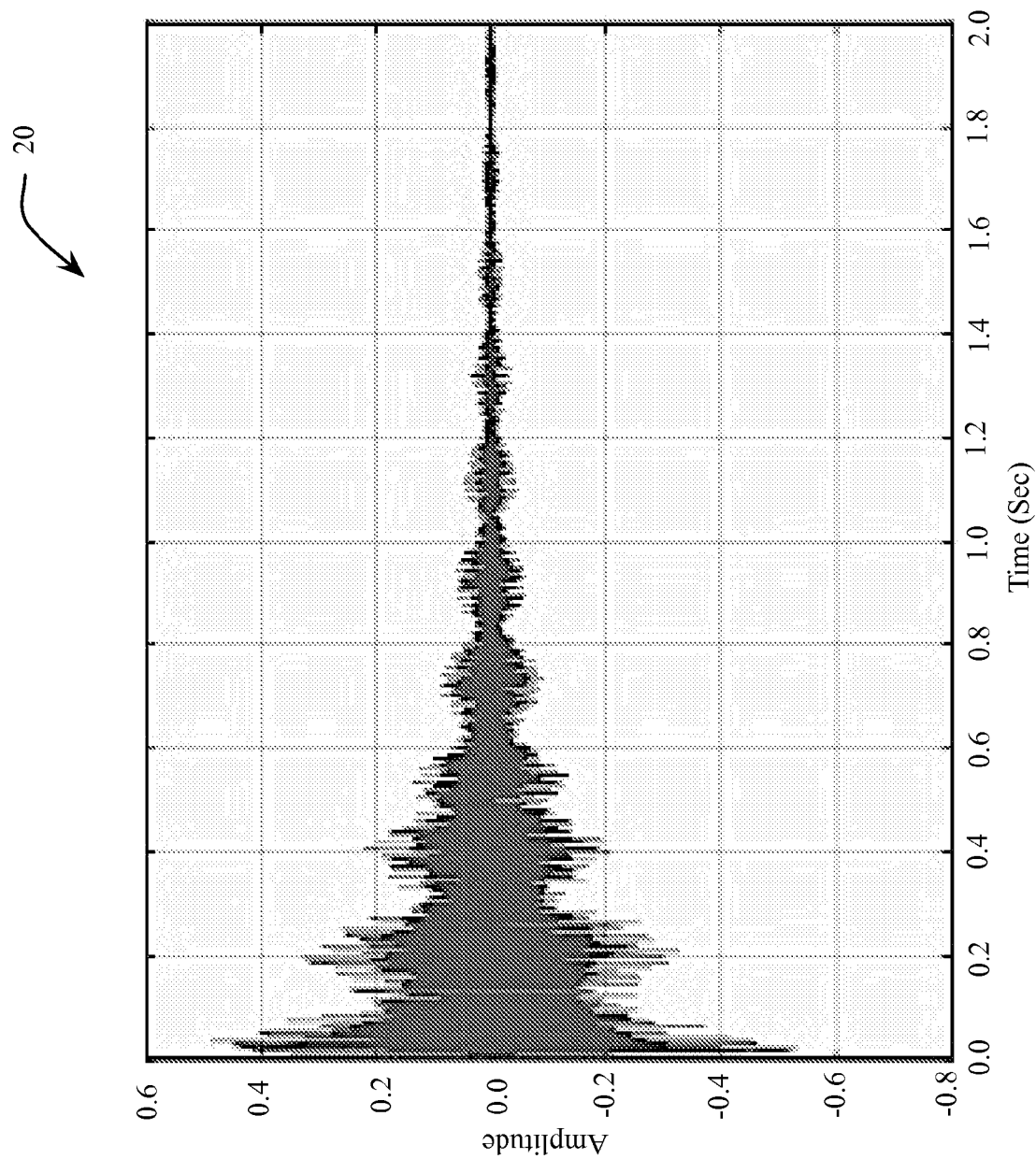
FIG. 2 is graphical view of a measured time-domain response of one embodiment of a drum when struck.
Figure 3:
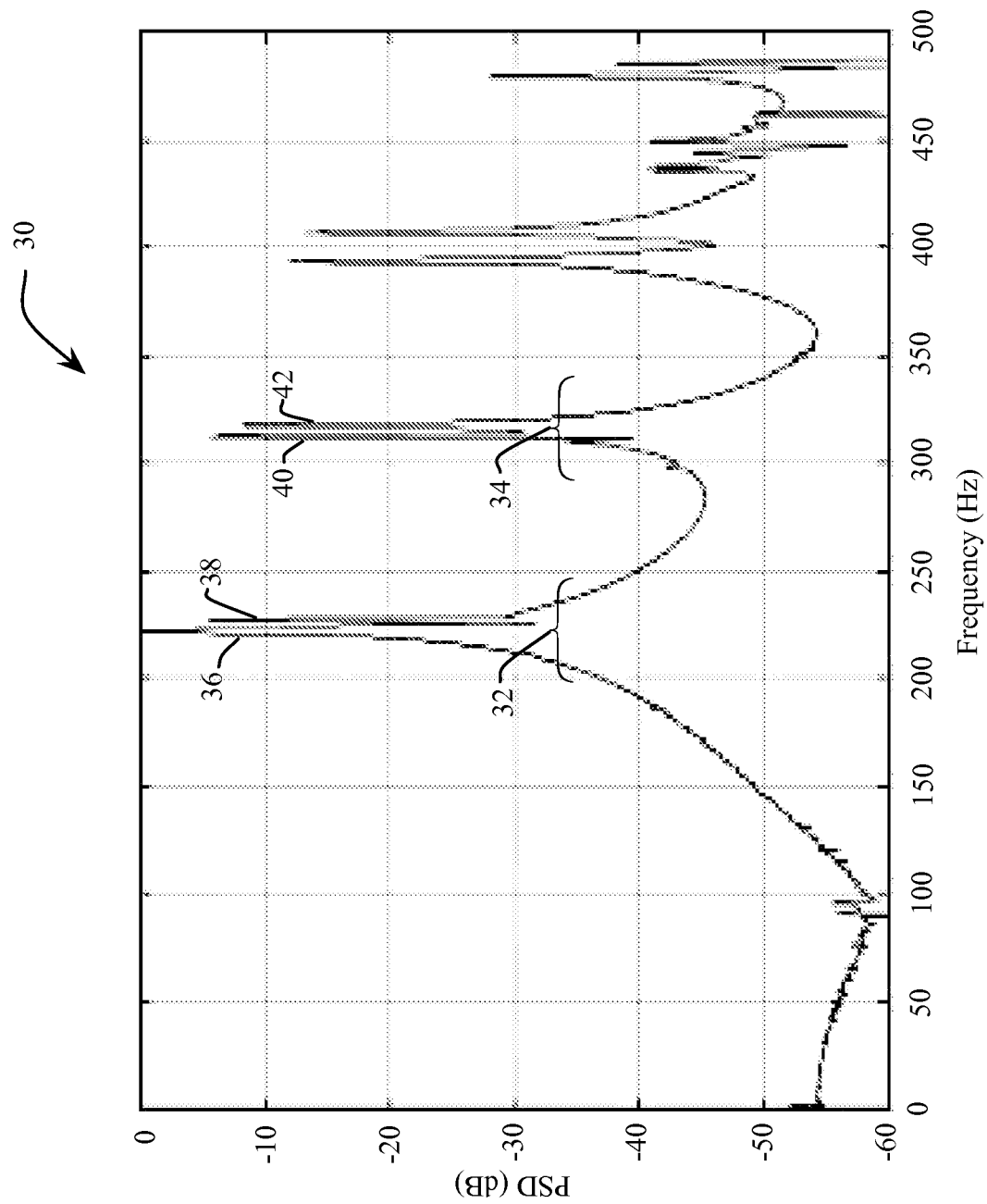
FIG. 3 is a graphical view of a calculated power-spectrum of the time-domain response as illustrated in FIG. 2 and according to an embodiment of the invention.

FIG. 2 shows a measured time-domain response of an example embodiment when the membrane 12 is struck, at location 24a for example. FIG. 3 shows a calculated power-spectrum of FIG. 2 according to an embodiment of the invention. Multiple spectral peaks 36, 38, 40 and 42 are calculated from the time-domain response shown in FIG. 1. The spectral peaks are further grouped into subsets 32 and 34 based on their spectral proximity. For example, spectral peaks 36 and 38 are grouped into the same subset 32 because they are sufficiently related based on frequency separation. Similarly, spectral peaks 40 and 42 are grouped into subset 34. In the example shown in FIG. 2, spectral peaks 36 and 38 each correspond to a fundamental frequency of one of two lugs, which are out of tune with respect to each other. In one example, spectral peak 36 corresponds a fundamental frequency associated with lug 24b, and spectral peak 38 corresponds to a fundamental frequency associated with nearby lug 25b. The subset 32 is a "fundamental subset" because it contains a spectral peak with the lowest frequency, excluding zero Hz. (D.C.). The spectral peaks 40 and 42 correspond to "overtones," which are undesirable higher frequency byproducts of the fundamental spectral peak produced when the initial impulse travels across the circular drum and around the periphery of the drum, in addition to other complex propagation paths. The highest amplitude spectral peak 36 within the fundamental subset 32 is chosen as the "fundamental spectral peak" associated with the lug 24b being tuned. Subsequently, lug 24b is tuned so that the fundamental spectral peak 36 matches a selected pitch. Each lug of the drum 10a is tuned in the manner described above until all lugs are "cleared" and tapping the drum 10a at any location 20a, 21a, 22a, 23a, 24a, 25a, 26a or 27a produces substantially the same fundamental pitch, which also corresponds to the selected pitch.

Figure 4:
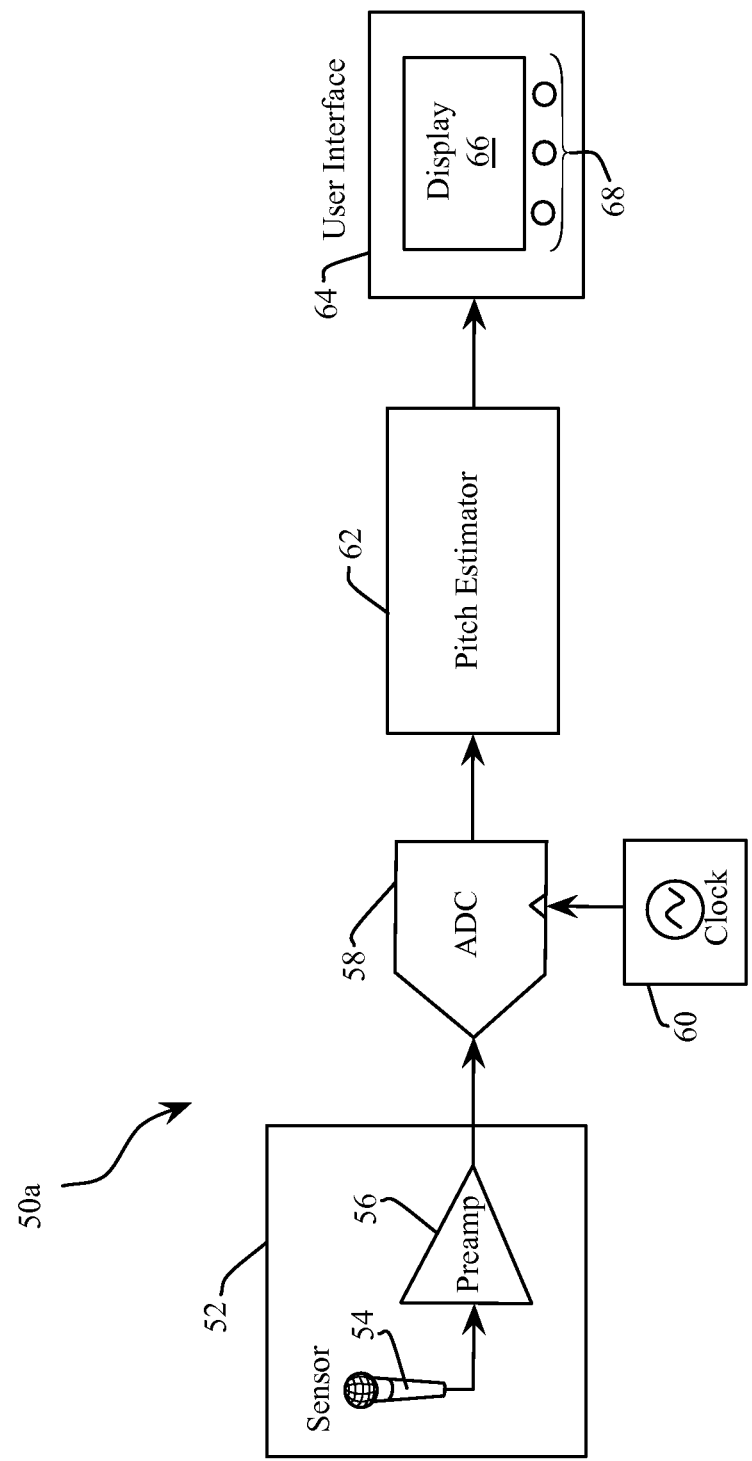
FIG. 4 is schematic view of an embodiment of a Drum-Tuner according to the invention.

FIG. 4 shows an example embodiment of a Drum Tuner 50a according to the invention. In one example, the Drum Tuner 50a is positioned over the drum 10a close enough (e.g. several inches) to detect the resonance of the membrane 12. The Drum Tuner need not be positioned near the lug being tuned. In one embodiment, the Drum Tuner is attached to the hoop 16 and remains stationary throughout the entire tuning process of one drum-head.

A receiver 52 detects a signal corresponding to a sound or vibration from a resonant structure, the drum 10a in FIG. 1 for example. In one embodiment, the receiver includes a sensor 54, a microphone for example, and a preliminary amplifier (Preamp) 56. The Preamp 56 includes a low pass filter to limit aliasing of subsequently sampled data. The signal received by the sensor 54 is amplified by the Preamp 56 and converted to a representative digital signal by an analog to digital convertor (ADC) 58. In one non-limiting embodiment the ADC 58 includes a 12 bit successive approximation register (SAR) operating at 8 k samples/sec with 8× decimation. The ADC 58 has a clock 60 with sufficient accuracy to determine the fundamental spectral peak 36. In one embodiment, the clock 60 is a crystal oscillator. For example, a clock 60 with 0.01 Hz accuracy for a sample rate of 1 k samples/sec is sufficient. The digital signal from the ADC 58 is processed by a Pitch Estimator 62 that estimates the fundamental spectral peak 36 from the signal received by the receiver 52. In one embodiment, each of the functions performed by the Pitch Estimator 62 are implemented with circuits. In another embodiment, each of the functions performed by the Pitch Estimator 62 are performed with one or more processors. In yet another embodiment, the Pitch Estimator 62 uses a combination of circuits and processors to perform its function. The frequency estimate is provided to a User Interface 64 that in turn displays at least one of the fundamental spectral peak 36, a nearest musical note and the deviation of the fundamental spectral peak 36 from the selected pitch. The user provides a variety of inputs to the Drum Tuner 50a with controls 68 on the User Interface 64. For example, inputs provided by the user include the selected pitch, type of drum and what type of information should be displayed. In addition, the User Interface provides controls for storing and recalling specified and measured pitches. Other user inputs are also envisioned within the scope of adjusting parameters of a resonant system in response to detection of a fundamental frequency.

Figure 5:
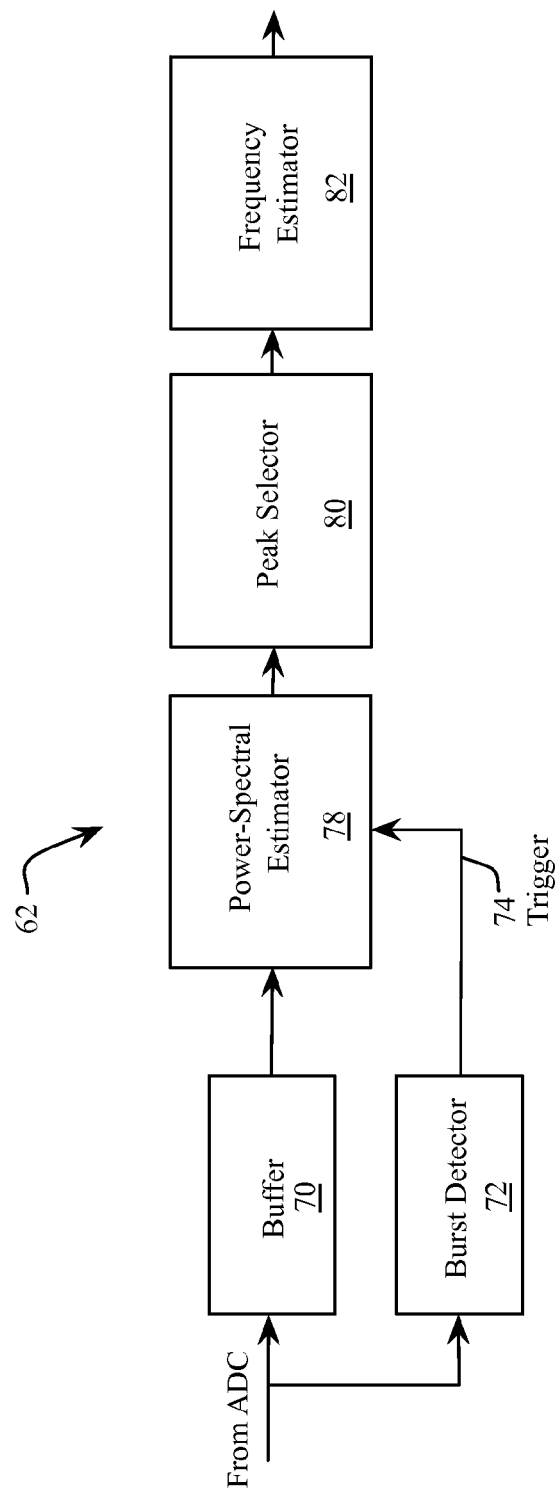
FIG. 5 is a schematic view of an embodiment of the Pitch Estimator shown in FIG. 4.

FIG. 5 shows an embodiment of the Pitch Estimator 62 as referenced in FIG. 4. The Pitch Estimator 62 stores a series of time samples from the ADC 58 in a buffer 70. In one embodiment the Buffer stores 1024 time samples. The number of samples stored in the Buffer is chosen to achieve a sufficient sample size for accurate measurement, to store sufficient samples for the duration of a drum burst, (e.g. 1 second) and to reduce the time required between successive measurements based on typical user expectations. A Burst Detector 72 detects the start of a signal burst typically corresponding to the beginning of the resonance of a structure after the structure has received an impulse of energy, a drum strike for example. In a preferred embodiment, the burst detection occurs after the cumulative energy of the digitized signal exceeds a pre-determined threshold. In another embodiment, the burst detector 72 determines when the digitized signal exceeds a threshold by a hysteresis value. In another embodiment, the burst detector 72 determines when a sum of a plurality of absolute values of the digitized signal exceeds a threshold, (or also a threshold value with hysteresis).

When a burst is detected by the Burst Detector 72, a Trigger signal 74 is enabled. The enabling of the Trigger signal 74 initiates several operations. A pre-determined number of samples of digitized data from the ADC 58 are stored in the Buffer 70 for subsequent processing. In one embodiment, the Power-Spectral Estimator 78 computes the power spectrum of the buffered data by transforming the samples into the frequency domain and computing the magnitude-squared value of the samples. After transformation from the time domain to the frequency domain, the data are generally complex and computing the magnitude-squared value of each sample consists of summing the squares of the real and imaginary values.

The Peak Selector 80 then identifies the spectral peaks of the power spectrum. In a preferred embodiment, the spectral peaks are calculated by first storing the magnitude-squared frequency domain samples in a "power array." The power array is searched to identify the "maximum value power sample." A "minimum peak power threshold" is then defined as a constant value below the maximum value power sample, typically 18 dB lower than the value of the maximum value power sample. The power array is then searched starting at the lowest frequency location and stopping at the highest frequency location and storing the magnitude and frequency of all the spectral peaks that are greater than the minimum peak power threshold in a "peak array." The spectral peaks are defined as samples from the power array with a zero value first derivative and a negative value second derivative when the power array is differentiated with respect to frequency. Typically, only the 10 lowest frequency spectral peaks identified in the ascending search are stored in the "peak array." The peak array will thus contain the first 10 spectral peaks in ascending order of frequency all of which will exceed the minimum power threshold.

In a preferred embodiment, the opposing membrane to the membrane 12 in FIG. 1 is damped. The Frequency Estimator 82 searches through the peak array and where any two successive spectral peaks are spectrally adjacent within a limited frequency bandwidth (or threshold) of 10 Hz for example, if the second spectral peak has a larger magnitude than the first spectral peak, the sequential position of the second spectral peak will be swapped with the first spectral peak. After these steps, the first entry in the peak array corresponds to the estimate of the frequency and magnitude (or power) of the fundamental spectral peak (or fundamental component) of the measure signal. This sorting of the spectral peaks results in a number of subsets, each with at least one spectral peak, where every spectral peak in a subset is spectrally adjacent to another spectral peak within a limited bandwidth (or threshold; e.g. 10 Hz). The spectral peak ordering method determines the fundamental subset having the spectral peak with the lowest frequency and selects the spectral peak with the largest magnitude in the fundamental subset as the fundamental spectral peak.

In another preferred embodiment, the opposing membrane to the membrane 12 in FIG. 1 is not damped (also referred to as "open") and is allowed to couple resonant energy to the membrane 12 when the drum is struck. This coupling of resonant energy introduces a lower frequency spectral peak below the frequency of the fundamental spectral peak generated when tuning with the opposing membrane damped. An open drum is tuned by altering the tuning method used to tune a drum with the opposing membrane damped to exclude the lowest frequency subset and choosing the fundamental spectral peak in the next highest frequency subset.

Figure 6:
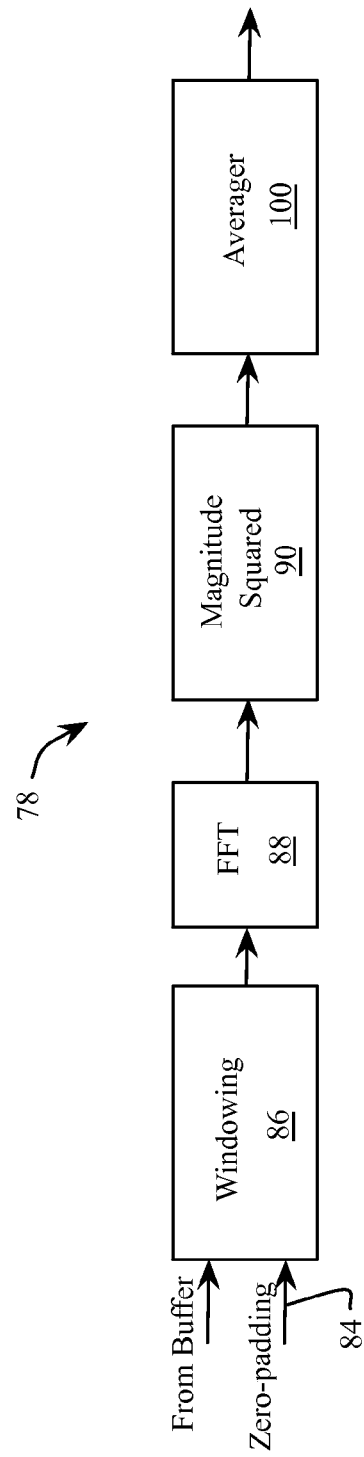
FIG. 6 is a schematic view of an embodiment of the Power-Spectral Estimator shown in FIG. 5.

FIG. 6 shows an embodiment of the Power-Spectral Estimator 78 as referenced in FIG. 5. The Power-Spectral Estimator 78 receives a series of buffered time samples from the Buffer 70 in FIG. 5 and optionally conditions the samples with Zero-padding 84 and Windowing 86 prior to converting the time samples to the frequency domain with a Fast Fourier Transform (FFT) 88. Zero-padding 84 refers to adding zero-value samples to the predominately non-zero value series of time samples to increase the size of the FFT and hence the resulting frequency resolution. For an FFT with N samples, (an "N point FFT"), with sample rate Fs, the frequency resolution is given by the equation $\Delta Fs=Fs/N$, so with a larger sample size N, finer frequency resolution is obtained. For example, in one embodiment, the Buffer 70 stores 1024 samples. By appending 3072 zero-value samples a 4096-point FFT is performed thereby increasing frequency resolution by a factor of 4. Although the buffer could optionally store 4096 samples and zero-padding could be avoided, at an effective 1 khz ADC sampling rate (or 8 kHz with 8 times decimation) the user would have to wait four seconds to fill the buffer while the typical drum burst only last one second as shown in FIG. 2.

The FFT is a specific implementation of a Time-To-Frequency-Transform, defined herein to refer to the conversion of time samples to the frequency domain irrespective of the algorithm used. For example, in other embodiments the Time-To-Frequency-Transform uses either a Discrete Fourier Transform (DFT), a Discrete Cosine Transform (DCT), a Fast Cosine Transform, a Discrete Sine Transform (DST) or a Fast Sine Transform (FST).

In a preferred embodiment Zero-padding 84 is used with Windowing 86. Because the series of time samples, with or without the Zero-padding 84, only represents a finite observation window, the resulting spectral information will be distorted after performing an FFT due to the ringing or $\sin(f)/f$ spectral peaks of the rectangular window. This is also referred to as "spectral leakage." To correct for this, each sample in a series of time samples is multiplied by a sample from a fixed waveform such as a Hanning, Bartlett or Kaiser window. In this embodiment these window functions have the same number of samples as the FFT (e.g. 4096), have symmetry about N/2 and increase in value from close to zero at the beginning and end of the time series to a maximum value at the center of the time series. In a preferred embodiment, a Blackman-Harris window function is used.

In a preferred embodiment the time samples are preconditioned with Zero-padding 84 and Windowing 86 and are subsequently converting to the frequency domain with an FFT processor. It is envisioned that any Discrete Fourier Transform (DFT) can be used to perform the frequency conversion without being limited to using an FFT. Following the FFT 88, the series of frequency samples forming an estimate of the frequency spectrum is converted into a power-spectral estimate by squaring each of the frequency samples with a Magnitude Squared function 90.

The Drum Tuner 50*a* operates on either isolated drum strikes or on a series of repetitive drum strikes. For repetitive drum strikes, the Burst Detector 72 re-triggers prior to the requisite number of time samples (e.g. less than 1024 samples in one embodiment) and the shorter series of time samples is zero-padded to the same length as an isolated burst. For example, an isolated burst has 1024 samples and is zero-padded to 4096 samples by adding an additional 3072 zero value samples. A repetitive strike occurring every 500 ms only has 512 samples in one example and would be extended to 4096 samples by adding 3584 zero value samples. In one embodiment, the Zero-Padding 84 detects the number of samples stored in the Buffer 70 and adjusts the number of zero value samples to be added accordingly, such that 4096 time samples result.

Spectral averaging is performed with an Averager 100 on the estimated power spectrum output for each successive burst thereby increasing the precision of the Power-Spectral Estimator 78 and the resulting estimate of the fundamental spectral peak. Spectral averaging is performed by taking the average of the magnitude-squared value of each frequency sample of the series of frequency samples with the magnitude-squared value of a corresponding previously stored frequency sample. For example, the 2nd frequency sample of a new burst is averaged with the second frequency sample of a previous burst. Zero padding occurs at the end of a shortened burst of time samples, so the proper alignment of time samples from current and previous bursts is maintained.

Figure 7:
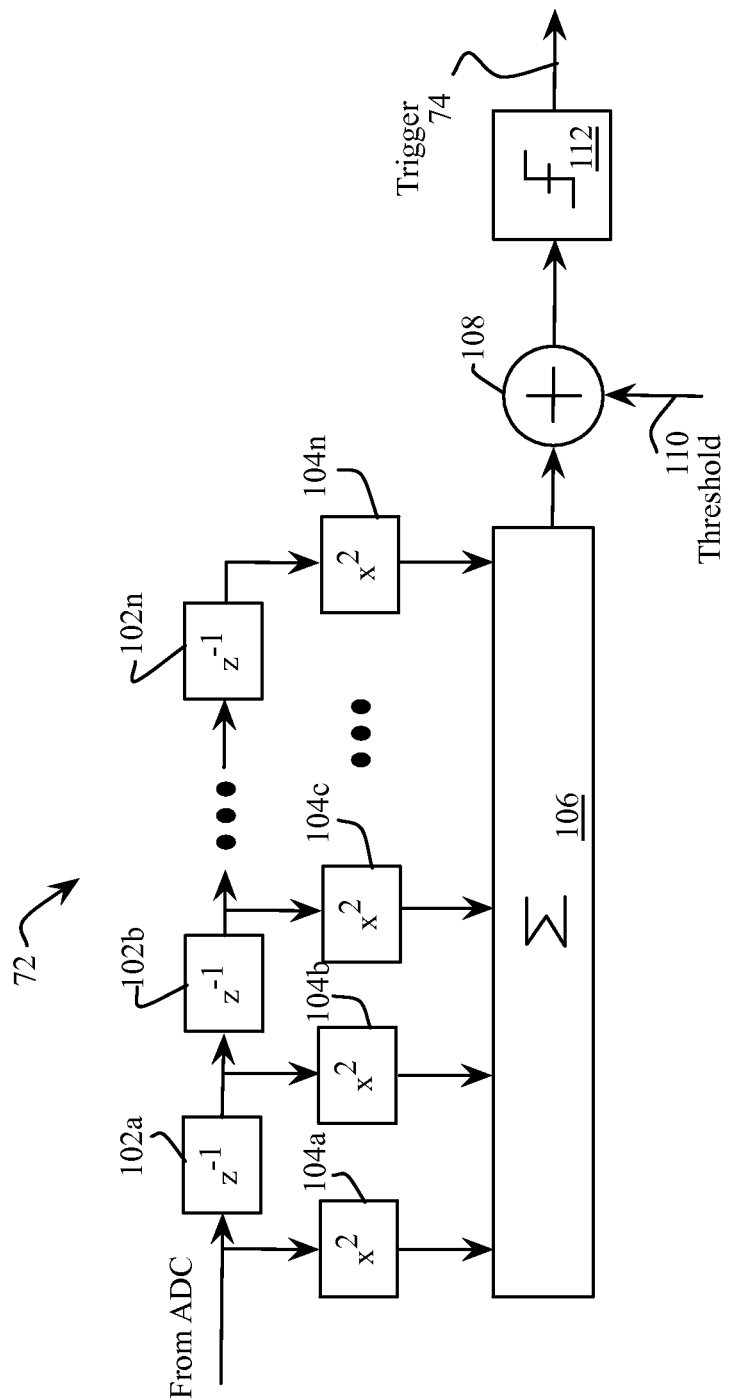
FIG. 7 is a schematic view of an embodiment of the Burst Detector shown in FIG. 5.

In one embodiment, the Burst Detector 72 of FIG. 5 includes a comparator that compares the digitized data from the ADC 58, or it's absolute value, to a threshold to enable the burst-detected Trigger 74. In a preferred embodiment shown in FIG. 7, energy detection is used. Energy detection is more complex but offers more reliable burst detection in the presence of noise sources and glitches. The energy of several consecutive samples (e.g. 8 samples in one embodiment) is calculated by squaring and summing the samples together. Specifically, a plurality of sample and hold circuits 102*a*, 102*b* through 102*n* (generally 102) hold the time samples from the ADC 58. In the example where the ADC 58 uses 12 bit resolution, each sample and hold circuit 102 is a 12 bit register in one embodiment. In another embodiment, the sample and hold circuit 102 is a First In First Out (FIFO) memory. Each time delayed sample from each sample and hold circuit 102 including a time sample without a delay is squared with circuits 104*a*, 104*b*, 104*c* through 104*n* (generally 104). Specifically, a sample with no delay is squared with circuit 104*a*, a previous sample held by sample and hold 102*a* is squared with circuit 104*b*, and so on. Each squared sample is summed with a summing circuit 106, compared to a Threshold 110 with a subtraction circuit 108, and activates a Trigger 74 if the value is positive as determined by a comparator 112. In a preferred embodiment, the value of the Threshold 110 is 5% of the peak burst energy. In an alternative embodiment using voltage level detection the threshold is 20% of the peak voltage.

Figure 8:
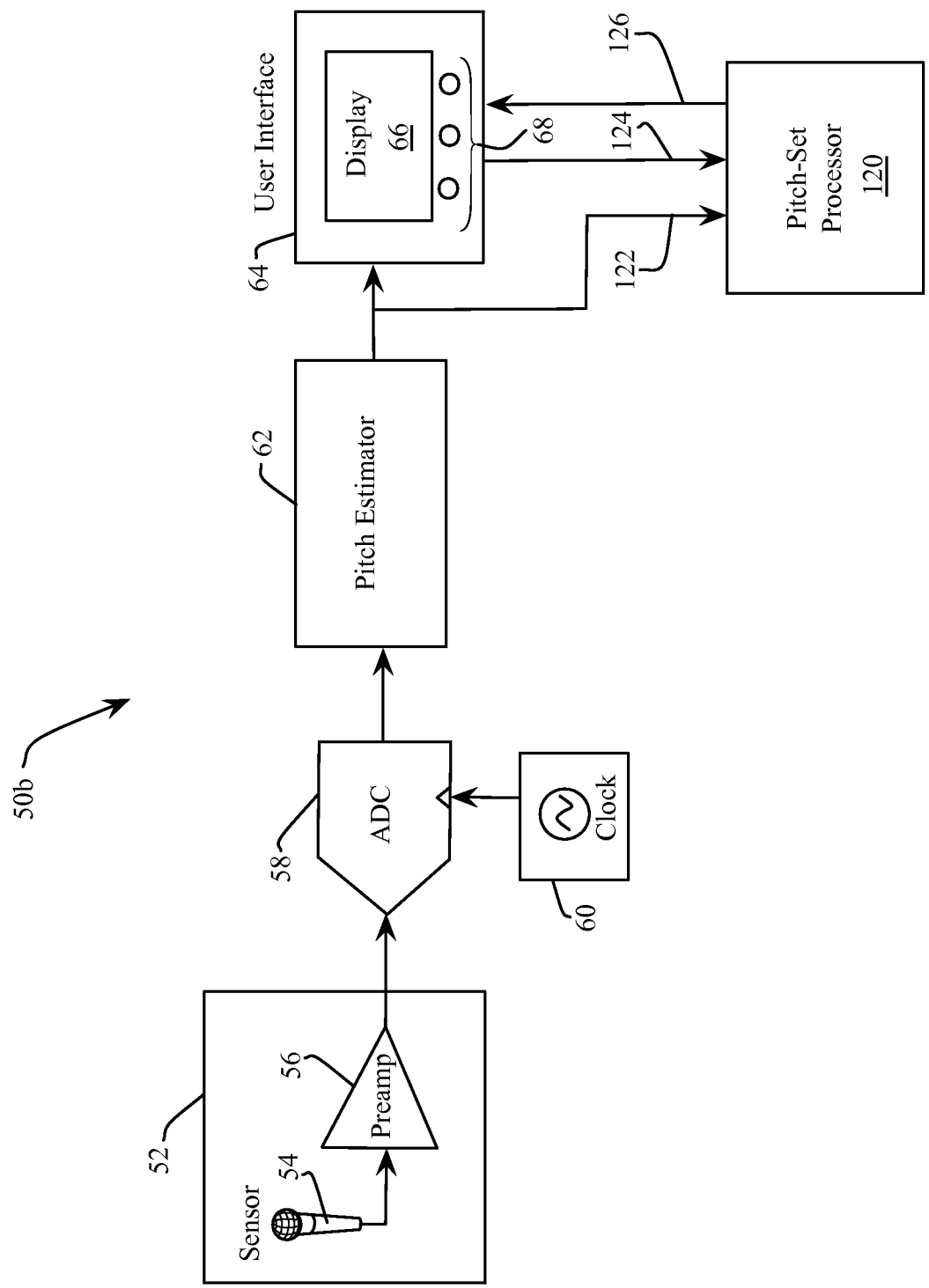
FIG. 8 is a schematic view of an embodiment of a Drum-Set Tuner according to the invention.

FIG. 8 shows a Drum-Set Tuner 50*b* as an alternative embodiment to the Drum Tuner of FIG. 4 including an additional Pitch-Set Processor 120 to facilitate tuning of multiple drums. The Pitch-Set Processor 120 selects the pitches (e.g. the desired fundamental spectral peak) of each drum-head in the drum-set based on criteria provided by the user via a User Interface 64. For example, the user will specify the sizes and number of drums in the drum-set and the type of tuning desired, such as a chord, interval, type of sound, or a famous drummer's tuning The Pitch-Set Processor 120 then indicates the selected pitch for each drum-head in the drum set thereby assisting the user in tuning each head of each drum to the correct pitch. In addition, the user can store specific or measured drum-set tunings in the Pitch-Set Processor 120 to be recalled at a later time. This storage mode includes pitches or musical notes entered by the user with controls 68 and communicated to the Pitch-Set Processor at 124 or pitches measured with the Drum Tuner by the user and communicated to the Pitch-Set Processor at 122. The Selected Pitch calculated by the Pitch-Set Processor 120 is communicated to the Display 66 at 126.

Figure 9:
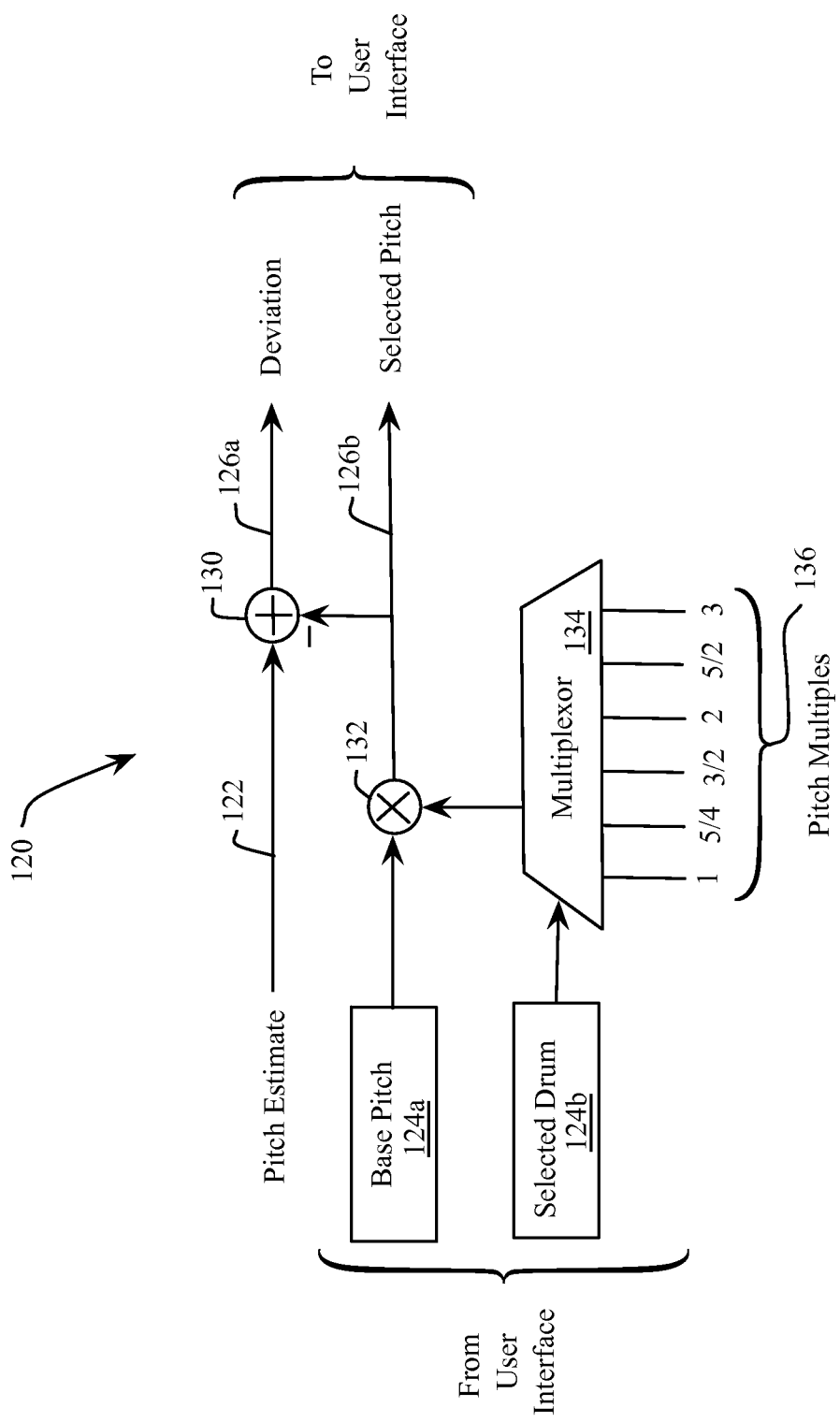
FIG. 9 is a schematic view of an embodiment of a Pitch-Set Processor shown in FIG. 8.

FIG. 9 shows a preferred embodiment of the Pitch-Set Processor 120 that determines the Selected Pitch 126*b* for tuning each of the drums in a set of drums to pitches comprising the notes in an extended Major chord. For example, the Major chord has pitches that are in increasing order relative to the lowest or Base Pitch 124*a* are 1, 5/4, 3/2, 2, 5/2 and 3, shown collectively as Pitch Multiples 136. The Base Pitch 124*a* and the Selected Drum 124*b* from the drum-set are supplied from the User Interface 64. The Selected Pitch 126*b* is computed according to its position in the chord as a product 132 of the Base-Pitch 124*a* and the selected Pitch Multiple 134, the Pitch Multiple 136 being selected by Multiplexor 134 controlled by the Selected Drum 124*b*. In addition to computing the Selected Pitch 126*b*, the Deviation 126*a* of the Selected Pitch 126*b* from the Pitch Estimate 122, (e.g. the fundamental spectral peak) is calculated by subtracting the Selected Pitch 126*b* from the Pitch Estimate 122 with the subtraction circuit 130. The Selected Pitch 126*b* and the Deviation 126*a* are both conveyed to the Display 66 at 126 shown in FIG. 8.

Figure 10:
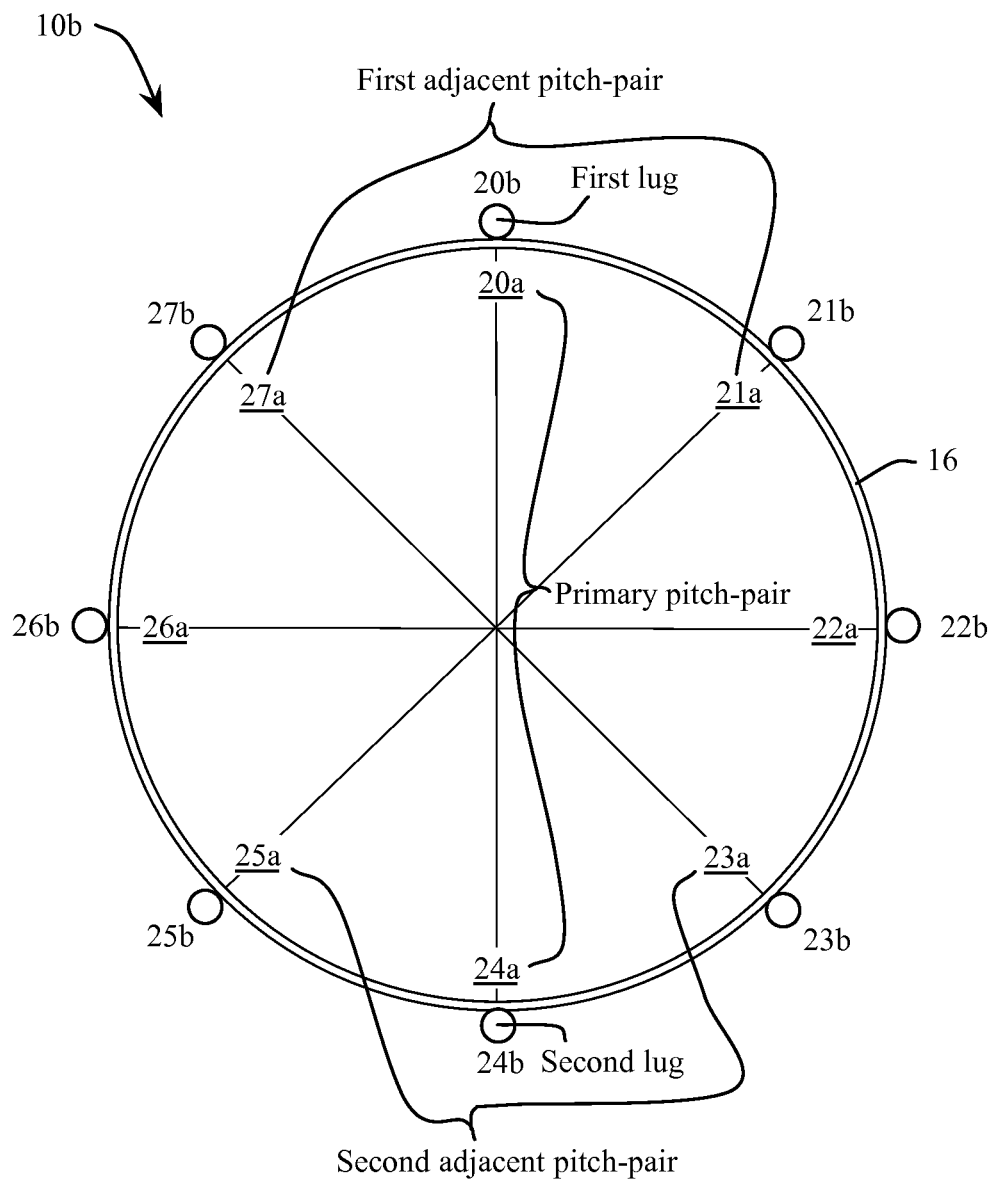
FIG. 10 is a top view of the drum shown in FIG. 1.

FIG. 10 is top view of the drum 10*a* shown in FIG. 1 illustrating an automatic tuning method according to a preferred embodiment of the invention. The Drum Tuner of FIG. 4 enables a user to tune a drum by measuring the individual pitches (e.g. the fundamental spectral peak) near each tuning lug and making corresponding adjustments to the lug tensions until the pitches are uniform. However, this is an iterative approach involving repeated pitch measurements and lug adjustments because the tension and pitch of the drum-head adjacent to a tuning lug depends not only on the tension of the closest lug but also to a lesser extent on the tension of all the other lugs. Consequently, there is an interaction between the tensioning of each lug.

For example, tightening a lug to raise the nearby drum-head pitch will also raise the pitch near the two adjacent lugs and the opposite lug to some extent. This inherent interaction between the tension of a single lug and the pitch of other lugs complicates drum-head tuning and increases the number of iterations that are required before uniformity is achieved. It would therefore be advantageous to automate the drum-head tuning process to account for the tension lug interaction and thereby minimize the number of iterations to simplify and speed up the tuning of a drum-head. This would also save the user the task of remembering the various pitches around the drum-head.

In the process of tuning a drum-head, it is possible to either increase the tension of the lugs corresponding to lowest pitch, or to lower the tension of the lugs corresponding to highest pitch, the former being preferable. Lowering the tension of a lug results in a partial de-seating of the lug screw and a less predictable or stable tension setting. As such, the following description is based on increasing tuning lug tension to raise the pitch of the lower pitched sections of the drum-head to match the pitch of the higher pitched sections.

Referring to FIG. 10, an embodiment of a drum 10*a* has 8 lugs 20*b*, 21*b*, 22*b*, 23*b*, 24*b*, 25*b*, 26*b* and 27*b* (generally "lugs"). Each lug has a corresponding location 20*a*, 21*a*, 22*a*, 23*a*, 24*a*, 25*a*, 26*a* and 27*a* (generally "tap location") where the drum-head is struck during tuning The automatic tuning process begins by tuning each of the lugs as previously described and saving the pitch estimate proximal to each lug. A plurality of pitch-pairs is then calculated by averaging the pitch proximal to each lug with the pitch proximal to a diametrically opposed lug. For example, the pitch 20*a* proximal to lug 20*b* is averaged with the pitch 24*a* proximal to 24*b*, and similarly for lug 21*b* with 25*b*, 22*b* with 26*b*, and 23*b* with 27*b* resulting in four pitch-pairs. For each of the four resulting pitch-pairs, the pitch-pair with the lowest average pitch is chosen as a "primary pitch-pair."

For example, in the embodiment shown in FIG. 10 the average pitch associated with lugs 20*b* and 24*b* has the lowest average pitch and the primary pitch-pair is as shown based on pitch measurements at 20*a* and 24*a*. The primary pitch-pair has a first lug, 20*b* and a second lug 24*b*. Adjusting the pitch associated with the first lug 20*b* will affect the pitch associated with all lugs, however the greatest effect will be with respect to the adjacent lugs 27*b* and 21*b* due to the forces from the hoop 16, and also with respect to the diametrically opposed lug 24*b*.

After establishing which of the four pitch-pairs is the primary pitch-pair, if either the first lug 20*b* or the second lug 24*b* have substantially different pitches associated with them (e.g. a 0.25 Hz difference) then the lower pitch of the two lugs will be adjusted first, then the other lug will be adjusted. Subsequently, the next lowest pitch-pair will be chosen as the primary pitch-pair and a similar adjustment made until all pitches associated with each lug are adjusted.

If the pitch associated with the first lug 20*b* and the second lug 24*b* of the primary pitch-pair are not substantially different then the determination of which of the first lug 20*b* and the second lug 24*b* is to be adjusted next then depends on the secondary effects on the adjacent lugs. A first adjacent pitch-pair is determined by averaging the pitch associated with the lugs 27*b* and 21*b* adjacent to the first lug 20*b*. A second adjacent pitch-pair is determined by averaging the pitch associated with the lugs 25*b* and 23*b* adjacent to the second lug 24*b*. If the first adjacent pitch-pair has a lower average pitch than the second adjacent pitch-pair then the first lug 20*b* is adjusted before the second lug 24*b*, otherwise the second lug 24*b* is adjusted first. Subsequently, the next lowest pitch-pair will be chosen as the primary pitch-pair and a similar adjustment made until all pitches associated with each lug are adjusted. In the example embodiment of a drum 10*b*, eight lugs are shown. It should be appreciated that the automatic tuning method similarly applies to other drum embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for resonance tuning comprising:
   receiving an analog signal in response to a resonance of a structure;
   digitizing the analog signal to create a plurality of time samples;
   detecting a burst of the time samples, enabling a trigger thereby;
   buffering a series of time samples from the plurality of time samples in response to the trigger being enabled;
   estimating a power spectrum by computing a Time-To-Frequency-Transform of the series of time samples to create a series of frequency samples and squaring a magnitude of each of the frequency samples;
   selecting one or more subsets of frequency samples from the series of frequency samples, each subset associated with one or more spectral peaks, each spectral peak including at least one of the frequency samples having a first magnitude exceeding a first threshold and being spectrally adjacent to any other of the frequency samples in any other spectral peak within the same subset by less than a second threshold; and determining a fundamental spectral peak in a fundamental subset, the fundamental subset including the spectral peak having the frequency sample at the lowest frequency greater than zero, and the fundamental spectral peak having the frequency sample with the largest first magnitude within the fundamental subset.

2. The method of claim 1 wherein detecting the burst of the time samples comprises enabling the trigger when the sum of a plurality of time samples with a magnitude-squared is larger than a third threshold.

3. The method of claim 1 wherein detecting the burst of the time samples comprises enabling the trigger when a magnitude of any one of the time samples is larger than a third threshold.

4. The method of claim 1 wherein detecting the burst of time samples comprises enabling the trigger when the sum of a plurality of absolute values of time samples is larger than a third threshold.

5. The method of claim 1 wherein estimating the power spectrum further comprises adding zero-value samples to the series of time samples.

6. The method of claim 1 wherein estimating the power spectrum further comprises multiplying each of the series of time samples by a weighting factor defined by a window function.

7. The method of claim 1 wherein estimating the power spectrum further comprises averaging a magnitude-squared value of each frequency sample of the series of frequency samples with a corresponding previously stored magnitude-squared value of frequency sample.

8. The method of claim 1 further comprising displaying information to a user based on the fundamental spectral peak.

9. The method of claim 1 wherein the Time-To-Frequency-Transform is a Fast Fourier Transform.

10. The method of claim 1 wherein the Time-To-Frequency-Transform is a Fast Cosine Transform.

11. The method of claim 1 wherein determining the fundamental spectral peak in a fundamental subset further comprises excluding a coupled-resonant subset resulting from a resonance of a coupled-structure not being damped and the coupled-structure being coupled to the structure, the coupled-resonant subset including the spectral peak having the frequency sample at the lowest frequency greater than zero, and the fundamental subset including a next highest frequency sample not included in the coupled-resonant subset.

12. A resonance tuner comprising:
a receiver configured to generate a signal in response to a resonance of a structure;
a pitch estimator in communication with the receiver, and configured to calculate a fundamental spectral peak of the resonance of the structure from the signal;
an interface module in communication with the pitch estimator, and configured to display information to a user based on a fundamental spectral peak of the structure, the pitch estimator comprising:
a peak selector configured to select one or more spectral peaks from one or more subsets of frequency samples generated from the signal; and
a frequency estimator in communication with the peak selector, the frequency estimator configured to identify a fundamental spectral peak from the one or more subsets, the pitch estimator further comprising:

a burst detector in communication with an analog to digital converter, and configured to detect a burst of time samples corresponding to the signal and enable a trigger thereby;
a buffer in communication with the analog to digital converter, and configured to hold a series of time samples from the plurality of time samples;
a power-spectral estimator in communication with the buffer and the burst detector, the power-spectral estimator enabled by the trigger, and configured to generate a series of frequency samples by performing a Time-To-Frequency-Transform on the series of time samples and configured to square the magnitude of each of the series of frequency samples;
the peak selector in communication with the power-spectral estimator, the peak selector configured to select the one or more subsets of frequency samples from the series of frequency samples, each subset associated with one or more spectral peaks, each spectral peak including at least one of the frequency samples having a first magnitude exceeding a first threshold and being spectrally adjacent to any other of the frequency samples in any other spectral peak within the same subset by less than a second threshold; and
the frequency estimator in communication with the peak selector, the frequency estimator configured to identify the fundamental spectral peak in a fundamental subset, the fundamental subset including the spectral peak having the frequency sample at the lowest frequency greater than zero, and the fundamental spectral peak having the frequency sample with the largest first magnitude within the fundamental subset.

13. The resonance tuner of claim 12 wherein the receiver comprises:
an acoustic sensor responsive to the resonance of the structure; and
a signal conditioner in communication with the acoustic sensor, and configured to attenuate higher frequency signals of the analog signal.

14. The resonance tuner of claim 12 wherein the burst detector comprises a circuit to determine the sum of a plurality of time samples with magnitude squared and to enable the trigger when the sum is larger than a third threshold.

15. The resonance tuner of claim 12 wherein the burst detector comprises a circuit to enable the trigger when any one of the time samples is larger than a third threshold.

16. The resonance tuner of claim 12 wherein the burst detector comprises a circuit to enable the trigger when the sum of a plurality of absolute values of time samples is larger than a third threshold.

17. The resonance tuner of claim 12 wherein the frequency estimator is configured to exclude a coupled-resonant subset resulting from a resonance of a coupled-structure not being damped and the coupled-structure being coupled to the structure, the coupled-resonant subset including the spectral peak having the frequency sample at the lowest frequency greater than zero, and the fundamental subset including a next highest frequency sample not included in the coupled-resonant subset.

18. The resonance tuner of claim 12 wherein the power-spectral estimator comprises:
a Time-To-Frequency-Transform circuit in communication with the buffer, and configured to generate a series of frequency samples from the series of time samples; and a magnitude-squared circuit in communication with the Time-To-Frequency-Transform circuit, and configured to square the magnitude of each of the frequency samples.

19. The resonance tuner of claim 18 wherein the Time-To-Frequency-Transform circuit is a Fast Fourier Transform circuit.

20. The resonance tuner of claim 18 wherein the Time-To-Frequency-Transform circuit is a Fast Cosine Transform circuit.

21. The resonance tuner of claim 18 wherein the power-spectral estimator further comprises a padding circuit disposed between the buffer and the Time-To-Frequency-Transform circuit, the padding circuit configured to add a plurality of zero-value time samples to the series of time samples.

22. The resonance tuner of claim 18 wherein the power-spectral estimator further comprises a windowing circuit disposed between the buffer and the Time-To-Frequency-Transform circuit, the windowing circuit configured to multiply each of the series of times samples by a weighting factor defined by a window function.

23. The resonance tuner of claim 18 wherein the power-spectral estimator further comprises a storage circuit in communication with the magnitude-squared circuit and configured to average each frequency sample of the series of frequency samples with a corresponding previously stored frequency sample.

24. The resonance tuner of claim 12 wherein the structure is a membrane of a drum.

* * * * *

UNITED STATES PATENT AND TRADEMARK OFFICE
CERTIFICATE OF CORRECTION

PATENT NO.        : 8,642,874 B2
APPLICATION NO.   : 13/004166
DATED             : February 4, 2014
INVENTOR(S)       : David Byrd Ribner It is certified that error appears in the above-identified patent and that said Letters Patent is hereby corrected as shown below:

In the Claims:

Add missing claims 25 and 26:

25. The resonance tuner of claim 12 further comprising:
    a pitch-set processor in communication with the pitch estimator and the user interface module, the pitch-set processor specifying the pitches of the various drum-heads in a set of drums; and
    wherein said interface module includes one or more input controls configured to accept user inputs and a display configured to display information to a user based on a fundamental spectral peak of the membrane of the drum.

26. The resonance tuner of claim 25, wherein the pitch-set processor comprises a subtraction circuit configured to subtract a selected pitch from the fundamental spectral peak and to output a deviation, a multiplier circuit configured to multiply a selected pitch multiple with a base pitch and to output the selected pitch, a multiplexer circuit configured to provide the selected pitch multiple from one of a plurality of pitch multiples according to a selected drum, the base pitch and the selected drum in communication with the one or more input controls of the user interface module, and at least one of the selected pitch and the deviation in communication with the display of the user interface module.

Signed and Sealed this
Sixth Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,642,874 B2 | Page 1 of 1 |
| APPLICATION NO. | : 13/004166 | |
| DATED | : February 4, 2014 | |
| INVENTOR(S) | : David Byrd Ribner | |

It is certified that error appears in the above-identified patent and that said Letters Patent is hereby corrected as shown below:

On the title page, under abstract "24 Claims, 10 Drawing Sheets" should read --26 Claims, 10 Drawing Sheets--.

In the Claims:

Add missing claims 25 and 26:

25. The resonance tuner of claim 12 further comprising:
    a pitch-set processor in communication with the pitch estimator and the user interface module, the pitch-set processor specifying the pitches of the various drum-heads in a set of drums; and
    wherein said interface module includes one or more input controls configured to accept user inputs and a display configured to display information to a user based on a fundamental spectral peak of the membrane of the drum.

26. The resonance tuner of claim 25, wherein the pitch-set processor comprises a subtraction circuit configured to subtract a selected pitch from the fundamental spectral peak and to output a deviation, a multiplier circuit configured to multiply a selected pitch multiple with a base pitch and to output the selected pitch, a multiplexer circuit configured to provide the selected pitch multiple from one of a plurality of pitch multiples according to a selected drum, the base pitch and the selected drum in communication with the one or more input controls of the user interface module, and at least one of the selected pitch and the deviation in communication with the display of the user interface module.

This certificate supersedes the Certificate of Correction issued May 6, 2014.

Signed and Sealed this
Tenth Day of June, 2014

Michelle K. Lee
*Deputy Director of the United States Patent and Trademark Office*